US012686128B2

(12) United States Patent
Bylard et al.

(10) Patent No.: US 12,686,128 B2
(45) Date of Patent: Jul. 21, 2026

(54) HARDWARE-ACCELERATED RAY-TRACING FOR INTELLIGENT ROBOT TASK EXECUTION

(71) Applicant: Dexterity, Inc., Redwood City, CA (US)

(72) Inventors: Andrew Bylard, San Mateo, CA (US); Zhouwen Sun, San Mateo, CA (US); Shitij Kumar, Santa Clara, CA (US)

(73) Assignee: Dexterity, Inc., Redwood City, CA (US)

( * ) Notice: Subject to any disclaimer, the term of this patent is extended or adjusted under 35 U.S.C. 154(b) by 59 days.

(21) Appl. No.: 18/750,256

(22) Filed: Jun. 21, 2024

(65) Prior Publication Data

US 2024/0424676 A1     Dec. 26, 2024

Related U.S. Application Data

(60) Provisional application No. 63/523,336, filed on Jun. 26, 2023.

(51) Int. Cl.
| | |
|---|---|
| B25J 9/16 | (2006.01) |
| G06T 7/73 | (2017.01) |
| G06T 15/06 | (2011.01) |
| G06T 17/20 | (2006.01) |

(52) U.S. Cl.
CPC ............... B25J 9/1676 (2013.01); G06T 7/75 (2017.01); G06T 15/06 (2013.01); G06T 17/20 (2013.01); G06T 2207/30241 (2013.01); G06T 2210/21 (2013.01)

(58) Field of Classification Search
None
See application file for complete search history.

(56) References Cited

U.S. PATENT DOCUMENTS

| | | | | |
|---|---|---|---|---|
| 2014/0300595 | A1* | 10/2014 | Bakalash | ............... G06T 15/06 |
| | | | | 345/419 |
| 2019/0051192 | A1* | 2/2019 | Schick | .................... G08G 5/80 |
| 2019/0329073 | A1* | 10/2019 | Meltsner | .............. A61N 5/1077 |
| 2021/0323157 | A1* | 10/2021 | Usui | ........................ B25J 13/06 |
| 2022/0288781 | A1* | 9/2022 | Schoessler | ............. B25J 9/1651 |
| 2023/0286156 | A1* | 9/2023 | Murray | ................. B25J 9/0084 |
| 2024/0411963 | A1* | 12/2024 | Perry | ...................... G06F 30/27 |
| 2025/0178199 | A1* | 6/2025 | Longo | .................... B25J 9/1676 |
| 2025/0196352 | A1* | 6/2025 | Kresse | .................... B25J 13/08 |
| 2025/0366927 | A1* | 12/2025 | Rabindran | ............. A61B 34/35 |

* cited by examiner

*Primary Examiner* — Arslan Azhar
(74) *Attorney, Agent, or Firm* — Van Pelt, Yi & James LLP

(57) ABSTRACT

Use of hardware-accelerated raytracing for intelligent robot task execution is disclosed. In various embodiments, data comprising a geometric representation of a robot and one or more obstacles in a workspace in which the robot is located are used to determine, with respect to a pose of the robot in the workspace, whether the pose is associated with a collision condition with respect to one or more of the one or more obstacles, at least in part by performing hardware accelerated ray tracing with respect to rays originating from each of a plurality of points associated with the robot.

18 Claims, 7 Drawing Sheets

200

HARDWARE-ACCELERATED RAY-TRACING FOR INTELLIGENT ROBOT TASK EXECUTION

CROSS REFERENCE TO OTHER APPLICATIONS

This application claims priority to U.S. Provisional Patent Application No. 63/523,336 entitled HARDWARE-AC-CELERATED RAY-TRACING FOR INTELLIGENT ROBOT TASK EXECUTION filed Jun. 26, 2023, which is incorporated herein by reference for all purposes.

BACKGROUND OF THE INVENTION

A robot performing a task in a collision-constrained environment needs to avoid self-collisions and collisions with the environment. The collision environment may be changing (e.g., the robot holding different objects, new/changing obstacles such as humans/other robots/boxes), meaning new task execution and motion strategies may need to be computed in real time. This means robotic systems using a collision-checking module need the collision-checking engine to be fast.

Geometric representations of the robot and obstacles can be very complex. For example, an object or feature of the workspace may be non-convex, with many small features. Obstacles can be represented by large point clouds or triangle meshes (e.g., synthesized from CAD models or high-dimensional perception data sources such as depth camera/lidar), or otherwise.

The collision-checking engine may need to perform a wide variety of queries depending on the situation, e.g., Boolean point/curve collision-checks; distance measurement/gradients (i.e., signed distance, direction-dependent signed distance, etc.); approximate representations of collision-free space as constraints for optimization modules; etc.

Previous approaches using CPU- or GPU-based collision-checking modules have often been too slow, not well-maintained, and/or not sufficiently feature-filled to meet operational requirements.

BRIEF DESCRIPTION OF THE DRAWINGS

Various embodiments of the invention are disclosed in the following detailed description and the accompanying drawings.

DETAILED DESCRIPTION

Figures 1A, 1B:
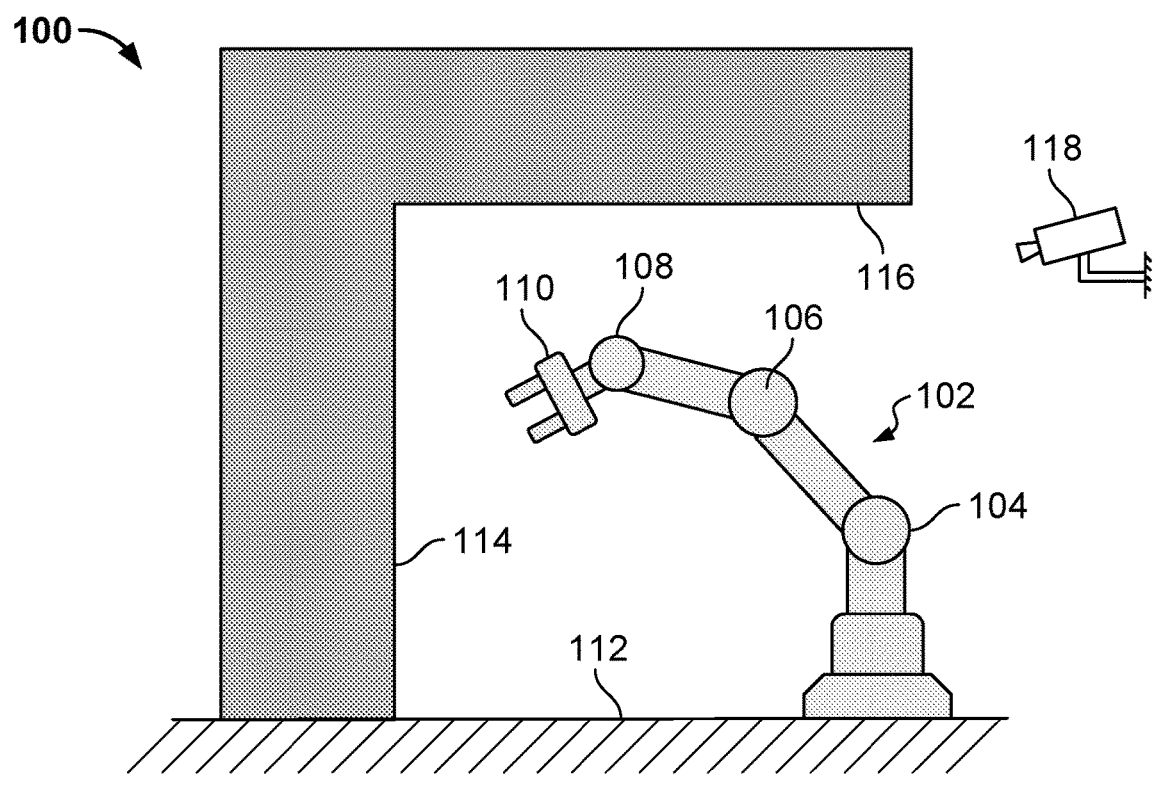
FIG. 1A is a diagram illustrating an embodiment of a robotic system configured to use accelerated ray tracing for robot control.
FIG. 1B is a diagram illustrating an embodiment of a robotic system configured to use accelerated ray tracing for robot control.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to use ray-tracing cores on graphics processing units (GPUs), usually used for graphics rendering, to gain geometric information about a scene, such as to enable a robotic system to avoid collisions between the robot and itself and/or obstacles in or comprising the environment in which the robot is operating.

In various embodiments, rays are traced out from the robot to see how far away obstacles are in different directions.

In various embodiments, performing collision avoidance computations via hardware accelerated ray tracing enables collision queries to be processed much faster than using prior approaches. Collision-checking rays against large sets of meshes/geometric primitives is computationally expensive, but their implementation in specialized silicon, such as a GPU, makes it very fast and therefore feasible. For example, parallelization on the GPU allows using very complex geometry representations while maintaining speed. The GPU ray tracing cores can use large point clouds (e.g. from perception system) and complex meshes (e.g. from CAD or from processing perception data) to detect collisions. Post-processing of the large amount of returned data can be tractably done on the GPU. High information density, allows many different types of collision queries.

In various embodiments, techniques disclosed herein may be used to perform one or more of:

High-level decision making (e.g. choose tasks to perform based on Boolean collision checks/distance checks);

Motion planning (using Boolean point/curve collision checks, distance checks, etc); and Trajectory optimization and collision-aware robot control (using collision constraint generation, distance checks, etc.).

FIG. 1A is a diagram illustrating an embodiment of a robotic system configured to use accelerated ray tracing for robot control. In the example shown, robotic system 100 includes a robotic arm 102 comprising shoulder joint 104, elbow joint 106, and wrist joint 108, along with links connected by said joints, and end effector 110 mounted on/to/near wrist joint 108. Robotic arm 102 is mounted fixedly on floor 112 of a workspace bounded by wall 114 and overhead 116.

For simplicity, FIG. 1A shows only the robot 102, 104, 106, 108, 110 and obstacles comprising the workspace 112, 114, 116, but in practice the workspace typically would include as well other obstacles, such as items and/or stacks of items to be handled by the robotic arm 102; pallets, containers, and/or other receptacles, e.g., from which the robotic arm 102 may be being used to remove items or into/onto which the robotic arm 102 may be being used to place items; other equipment, such as conveyors, forklifts, other robots, etc.; and, potentially, obstacles that dynamically change their pose and/or position, such as human or other robotic workers.

In the example shown, robotic system further includes a camera 118, in this example mounted in a fixed position in the workspace. In various embodiments, a workspace may include one or more cameras, including cameras mounted in fixed locations in the workspace; cameras configured to be repositioned such as by panning or tilting; and/or cameras mounted on robotic arm 102. In various embodiments, camera 118 may be a 3D camera configured to generate both 2D image data (e.g., RGB data) and a point cloud or other depth/distance data. In some embodiments, a control computer comprising or otherwise associated with robotic system 100 may receive image/depth data from camera 118 and may use such data to construct a 3D view of the workspace and/or obstacles present therein.

FIG. 1B is a diagram illustrating an embodiment of a robotic system configured to use accelerated ray tracing for robot control. In the example shown, a GPU or other processor or set of processors capable of performing high-speed ray tracing processing is used to detect and avoid collisions by the robot with itself and/or obstacles in the workspace.

In the example shown, multiple rays are traced from each of two points on the surface of the robot, specifically a point at the bottom of end effector 110 and the top of elbow joint 106. (In other examples, rays may instead or in addition be traced from the interior of the robot and/or a component thereof and/or from an obstacle in the workspace.) In operation, the rays traced from the points as shown and/or similar rays traced from other points on the surface of the robot may be used to detect, in advance of moving the robot into the pose as shown in FIG. 1A and FIG. 1B, whether any part of the robot would collide with itself or an obstacle in the environment if the robot were moved into the pose as shown, e.g., as part of a planned or contemplated potential trajectory through which the arm may be moved to perform a required task. If at each pose comprising the trajectory no collision is detected, the trajectory may be considered feasible. If at any pose the rays indicate a collision would occur or come too close to potentially occurring, the trajectory may be modified, as discussed further below.

While in the illustrative example shown in FIG. 1B multiple rays are traced from each sample point on the robot to each obstacle in the workspace, in various embodiments a single ray may be traced to each obstacle, e.g., a ray associated with the nearest distance from that point to that obstacle.

Figure 2:
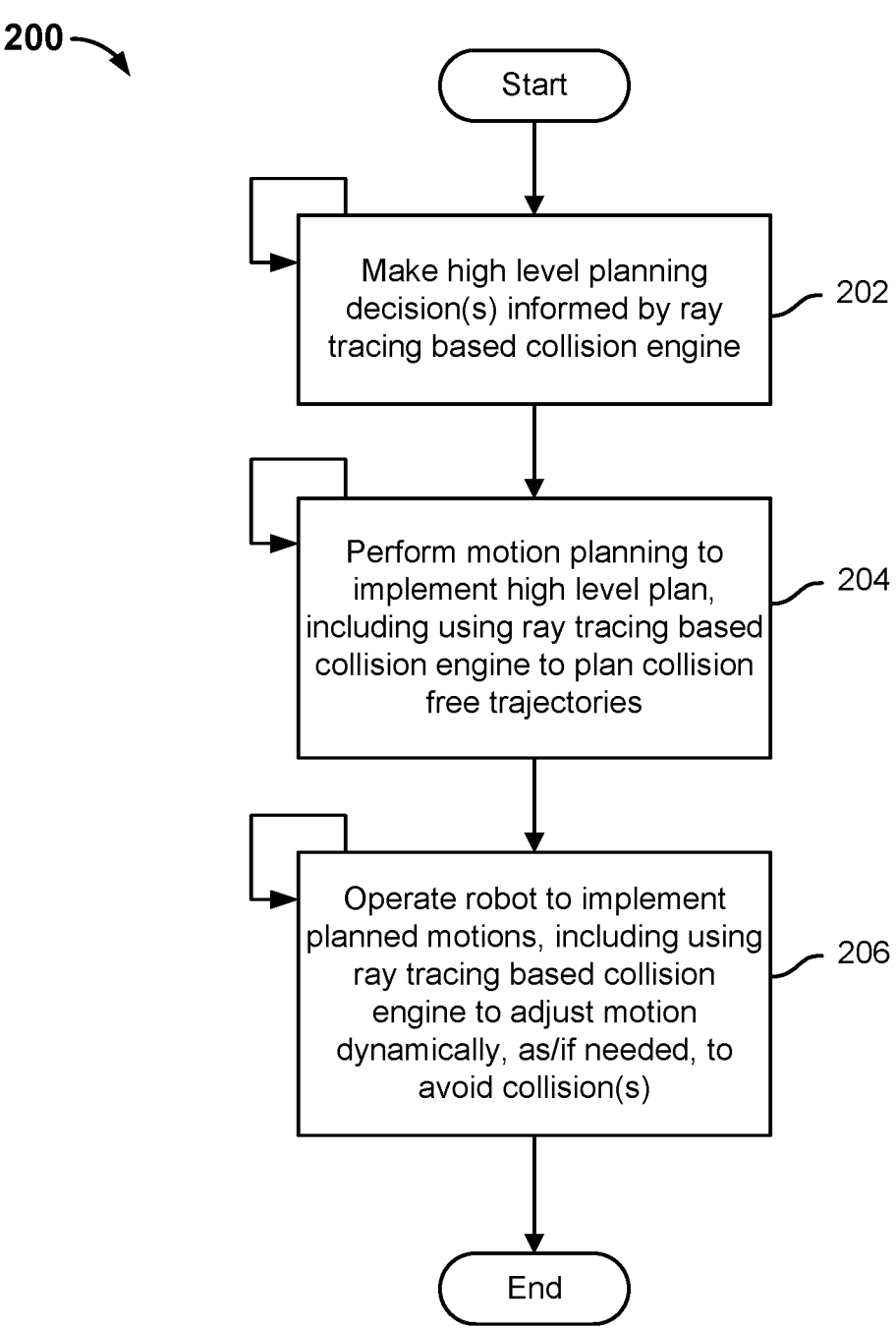
FIG. 2 is a flow diagram illustrating an embodiment of a process to use accelerated ray tracing for robot control.

FIG. 2 is a flow diagram illustrating an embodiment of a process to use accelerated ray tracing for robot control. In various embodiments, process 200 of FIG. 2 is performed by a control computer, e.g., a control computer configured to control the robotic system 100 of FIGS. 1A and 1B.

In the example shown, at 202 high level planning decisions are made, at least in part using ray tracing-based collision avoidance as disclosed herein. In various embodiments, a high-level decision-making module determines high-level task specifications for the robot to perform. Task specifications may include determining what is the goal "state" of the robot system and world; what object to pick up (in what order); what start and end end-effector poses to move between; when should the task start; etc.

Example uses for a ray-traced collision module for high level planning include, without limitation, checking if potential intermediate/end poses are collision free; checking how far potential intermediate/end poses are from collision; computing and using signed distance gradients to search for ideal intermediate/end poses; creating and using approximate convex collision constraints to perform a collision-constrained search for ideal intermediate/end poses; using direction-dependent distance checks to take large informed gradient steps in pose search; performing the above checks while holding different target object options; perform the above checks at different times (if obstacles are dynamic); etc.

At 204, motion planning is performed to implement the high-level plan decided at 202, e.g., by using ray tracing collision-avoidance as disclosed herein to plan collision-free trajectories. In various embodiments, motion planning includes finding near-optimal kinematically-feasible collision-free paths (usually no time component) to perform a given task.

In various embodiments, hardware accelerated ray tracing is used in motion planning to perform one or more of the following: Check if potential path waypoints/segments are collision-free; check how far potential path waypoints/segments are from collision, reject them if they are too close; if path waypoints/segments are in collision, check direction and closest distance to get out of collision to adjust the path to be out of collision. For example, a path waypoint/segment may be in collision because a new obstacle was added and the system needs to refine the path. In various embodiments, gradient information generated by the GPU or other processor performing ray tracing may be used to determine the direction and/or distance to adjust the path. Or, the path may be adjusted iteratively and use ray-tracing to check for collisions, until collision free path/segment has been found.

In various embodiments, ray tracing techniques may be used to perform trajectory optimization, e.g., to find a locally optimal (or, ideally, globally) optimal trajectory that meets all constraints to complete a task. Constraints may include, e.g., avoiding collisions, kinematic/dynamic robot constraints, grasp constraints, etc. Examples of using ray tracing techniques, as disclosed herein, to perform trajectory optimization include, without limitation, creating approximate convex representations of free-space to use as collision constraints and checking signed distances to use in the objective function, e.g., to trade off time optimality with distance from collisions.

In some embodiments, ray tracing techniques may be used to create approximate convex representations of free-space to use as collision constraints in optimization-based control. The control computer posits a Boolean query: given a kinematically feasible motion plan, would the movement be collision free? The collision space may be defined by rich geometry (millions of triangles, high resolution point cloud, etc.), and ray tracing techniques enable many points (e.g., sample points on the surface of the robot and/or an item in its grasp) may be checked to see if any ray emanating from that point would indicate a collision. In some embodiments, point- or pose/path-specific results may be reduced to a single Boolean (yes=some collision(s), no=collision free).

For motion planning, the goal is to find a kinematically feasible collision free path, e.g., planning out the whole path between the way points, but only checking the kinematic feasibility. In various embodiments, ray tracing is used as disclosed herein to check for collision based not only on individual poses, e.g., at intermediate waypoints along a trajectory, but also paths between poses.

At 206, the robot is operated (controlled) to implement the planned/optimized motions, including by using ray tracing techniques as disclosed herein to adjust motion dynamically, as/if needed, to avoid collisions. Examples of using ray tracing-based collision avoidance techniques, as disclosed herein, to perform real time robotic control include, without limitation: check distances to use in the objective function of optimization-based control, e.g. to trade off tracking with distance from collisions, which may be useful if obstacles are added at execution time or are changing differently than predicted; checking distances to use in artificial potential field avoidance terms in non-optimization-based control, e.g., control based on an obstacle and the robot having potential fields that produce a virtual force repelling each other, which increases in magnitude as/if the robot and obstacle get closer; and use gradient information produced in connection with ray trace processing, which is directional, to determine a direction in which to adjust the motion plan to (most readily, at lowest cost) avoid collision.

Figure 3:
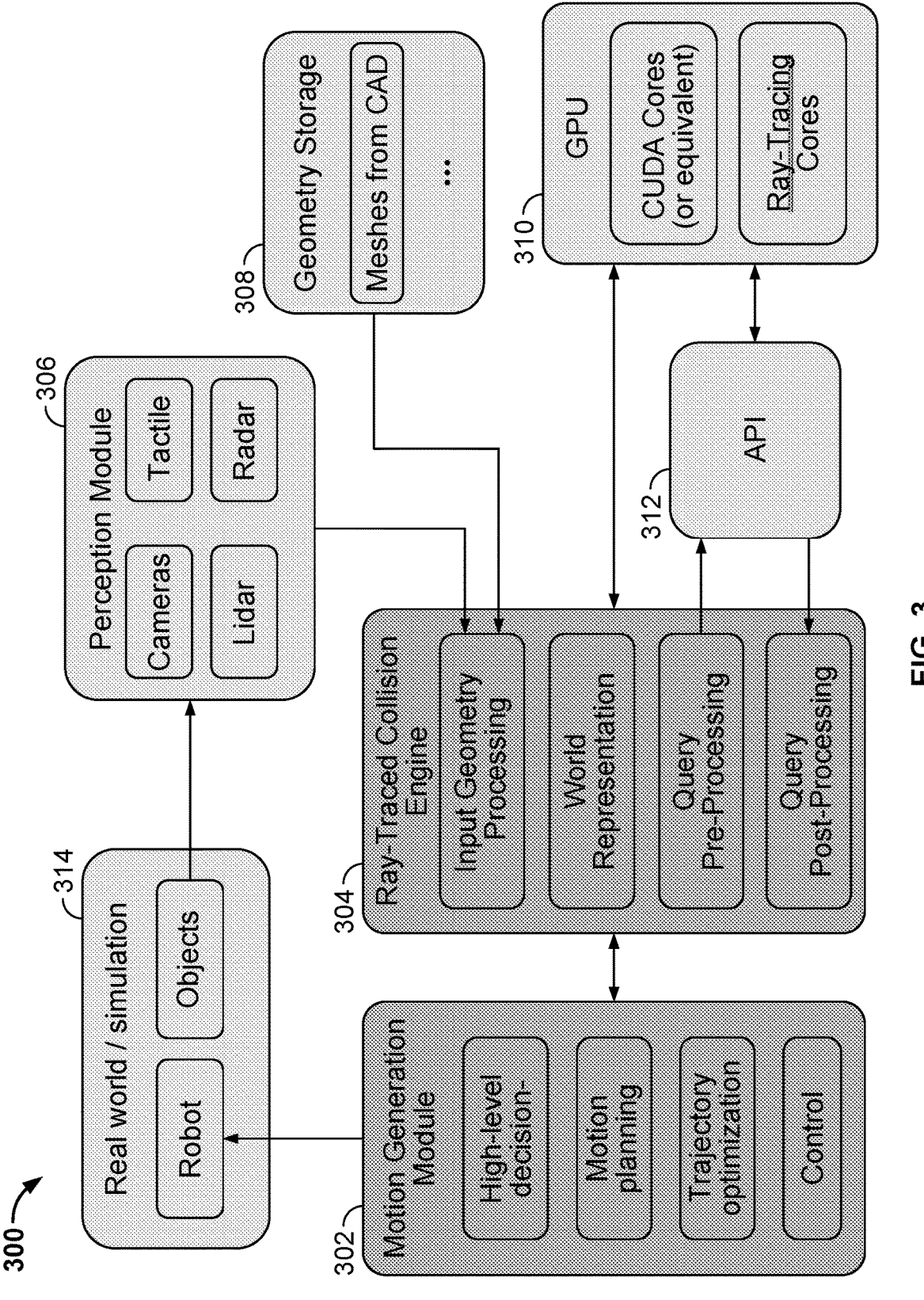
FIG. 3 is a block diagram illustrating an embodiment of a robotic system configured to use accelerated ray tracing for robot control.

FIG. 3 is a block diagram illustrating an embodiment of a robotic system configured to use accelerated ray tracing for robot control. In various embodiments, the modules comprising control system 300 of FIG. 3 may comprise processing modules running on a control computer, e.g., a control computer configured to control the robotic system 100 of FIGS. 1A and 1B.

In the example shown, control system 300 includes a motion generation module 302 configured to perform high-level decision making, motion planning, trajectory optimization, and robot control functions, e.g., as described above in connection with FIG. 2.

The control system 300 further includes a ray-traced collision engine 304 configured to perform ray trace-based collision detection and avoidance as disclosed herein. In the example shown, such processing includes input geometry processing based on data received from perception module 306 (e.g., perception of the robot and workspace from cameras, LIDAR, tactile sensors, radar, or other sensors) and a geometry data store 308 (e.g., mesh representation of robot and/or obstacles in the workspace, such as from CAD or other models). The ray-traced collision engine 304 generates a "world representation" based on the perception and geometry information, and pre-processes and post-processing queries to/from a graphics processing unit (GPU) 310 via an API (library, etc.).

The GPU 310 uses geometry and pose and/or path data associated with candidate trajectories to perform ray-trace based computations, using ray-tracing cores included among the cores comprising the GPU. A typical GPU may comprise hundreds or even a thousand, tens of thousands, or more cores, some number of which typically are dedicated to ray trace processing. This architecture enables numerous computations to be performed in parallel, enabling many, many poses and paths to be processed quickly to determine an optimal collision-free plan. Other cores not designated specifically for ray tracing are used, in various embodiments, to perform pre- and/or post-processing and/or other non-ray tracing tasks.

Motion generation module 302 uses the ray trace-based collision detection and avoidance processing, as disclosed herein, in some embodiments along with simulations of planned motions, to control the robot(s) comprising the system to manipulate objects in the (simulated and/or real world) environment, represented in FIG. 3 by real world/simulation 314.

Figure 4A:
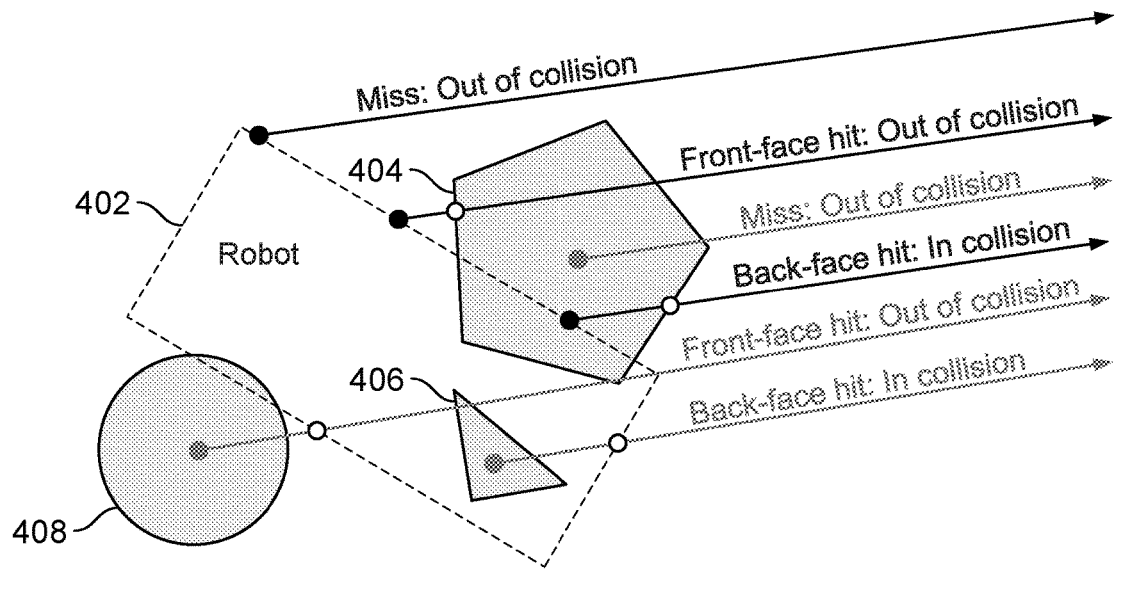
FIG. 4A is a diagram illustrating an example of using accelerated ray tracing to detect a collision condition in an embodiment of a robotic system configured to use accelerated ray tracing for robot control.

FIG. 4A is a diagram illustrating an example of using accelerated ray tracing to detect a collision condition in an embodiment of a robotic system configured to use accelerated ray tracing for robot control. In the example shown, ray trace-based techniques disclosed herein are used to determine whether robot 402 would be in collision with any one or more of objects (i.e., obstacles) 404, 406, or 408 in the pose shown.

In the example shown in FIG. 4A, rays are first traced from each of a plurality of sample points on the surface of the robot 402. The robot 402 and obstacles 404, 406, 408 are represented as/by disjoint watertight meshes/primitives. For each sample point on the surface of the posed robot, one ray is traced (in any direction) against the obstacles. If a ray's closest hit (intersection) with an obstacle (or another part of the robot) hits the back face of a triangle/primitive (e.g., ray direction is more aligned with the normal vector of triangle than the opposite of the normal vector), the ray origin is in collision, so the posed robot is in collision.

In the example shown in FIG. 4A, the topmost ray does not intersect anything and does not indicate any collision condition. The ray second from top, which intersects first a front face of obstacle 404, also does not indicate a collision condition. However, the ray fourth from top (traced from the third or lowermost point on the surface of robot 402) first intersects the back face of a triangle or other mesh/primitive shape comprising obstacle 406, which indicates the robot is (or would be) in collision with the obstacle 406 if in the pose shown in FIG. 4A.

Next, one ray is traced from the interior of each obstacle 404, 406, 408 toward the posed robot 402. If the ray's closest hit hits the back face of a triangle primitive, the ray origin is in collision, so the posed robot is in collision. In various embodiments, this step accounts for cases where an obstacle is fully enclosed inside a robot. In the example shown, the ray traced from the center of obstacle 404 does not intersect the robot and therefore is not associated with a collision condition; the ray traced from the center of obstacle 406 intersects the back face of a triangle or other primitive associated with the robot 402 and therefore is associated with a collision condition; while the ray traced from the center of obstacle 408 intersects first with a front face of a triangle or other primitive associated with the robot 200 and therefore is not associated with a collision condition.

In various embodiments, techniques disclosed herein are applied to determine, give a set of obstacles and a robot pose, whether the robot is or would be in collision with any obstacle(s) or itself. In some embodiments, a (single) Boolean result of "true" is returned if collision is detected, or "false" if no collision is detected. In the example in FIG. 4A, for example, detection of a collision condition based on the ray traced from the lowest point on the robot 200 and based on the ray traced from the center of obstacle 406 would result in a single Boolean result of "true" being returned, indicating a collision condition was detected with respect to the pose shown in FIG. 4A.

In various embodiments, processing similar to the ray trace-based collision detection described above would also be performed for robot geometry self-collision pairs, i.e., to detect collisions between the robot and other parts of itself.

In various embodiments, the accuracy of collision detection as disclosed herein depends at least in part on the robot point sampling density.

Figure 4B:
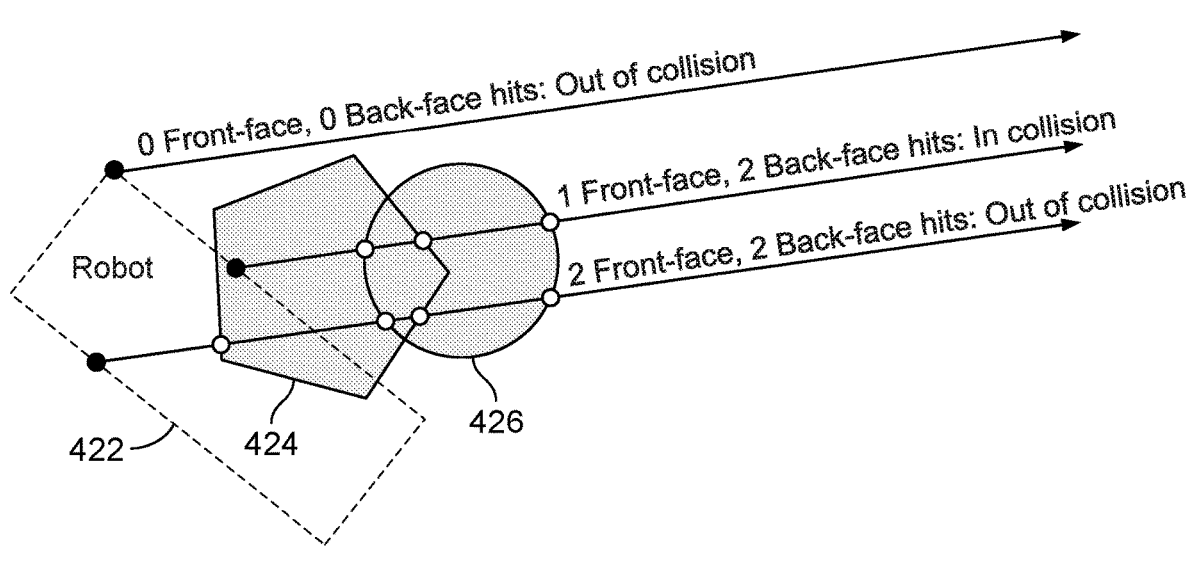
FIG. 4B is a diagram illustrating an example of using accelerated ray tracing to detect a collision condition in an embodiment of a robotic system configured to use accelerated ray tracing for robot control.

FIG. 4B is a diagram illustrating an example of using accelerated ray tracing to detect a collision condition in an embodiment of a robotic system configured to use accelerated ray tracing for robot control. In the example shown, robot 422 is posed as shown relative to obstacle 424 and obstacle 426. FIG. 4B illustrates an alternative approach used in some embodiments to detect collision by determining whether the number of back face hits is greater than the number of front face hits, for any traced ray. In some embodiments, the techniques shown in FIG. 4B may be used in an embodiment and/or context in which the obstacles in the workspace are not or are not necessarily disjoint. In the example shown, the topmost ray does not intersect with anything, so no collision is detected based on that ray. The middle ray interacts with a front face and two back faces; a collision condition is detected because the number of back face hits is greater than the number of front face hits. By contrast, the bottommost ray intersects with two front faces and two back faces, so no collision is detected based on that ray since the number of back face hits minus the number of front face hits is not greater than zero.

Figure 4C:
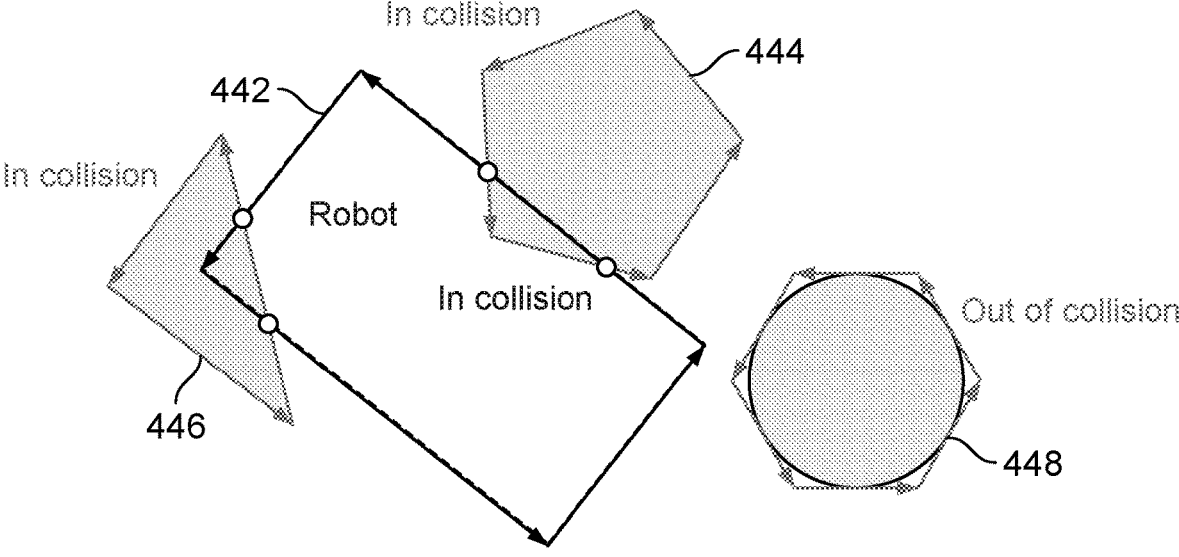
FIG. 4C is a diagram illustrating an example of using accelerated ray tracing to detect a collision condition in an embodiment of a robotic system configured to use accelerated ray tracing for robot control.

FIG. 4C is a diagram illustrating an example of using accelerated ray tracing to detect a collision condition in an embodiment of a robotic system configured to use accelerated ray tracing for robot control. In the example shown, robot 442 is posed as shown relative to obstacles 444, 446, and 448. In the approach illustrated by FIG. 4C, mesh approximations of the robot and obstacles are created (if needed, i.e., if the robot and obstacles are not already represented as meshes). For robot 442 toward obstacles 444, 446, 448, trace along the edges of the posed mesh representations of the robot 442 against the original representations of the obstacles 444, 446, 448. If there are any hits along a ray, there is a collision. In this example, the robot 442 is (or would be) in collision with obstacles 444 and 448.

In various embodiments, the system also performs an any-hit back-face count check from an interior point of each watertight robot geometry, from a surface point of each non-watertight robot geometry, and from robot point primitives.

The same is done for the obstacle against the robot and for the robot geometries against other robot geometries for each self-collision pair In various embodiments, performing a check in one direction, as shown in FIG. 4C, is sufficient for 2D but not in 3D. In 2D, tracing only from vertices in one direction is sufficient if the geometries are watertight. In 3D, the system traces along the edges of the mesh approximation of both the robots and the obstacles. In various embodiments, accuracy depends on the accuracy of the mesh approximations of the robot and obstacles. In various embodiments, the technique shown in FIG. 4C depends on the mesh approximations of the robot and obstacles being watertight. If the original representations were meshes, the technique described above in connection with FIG. 4C is perfectly accurate.

Figure 5:
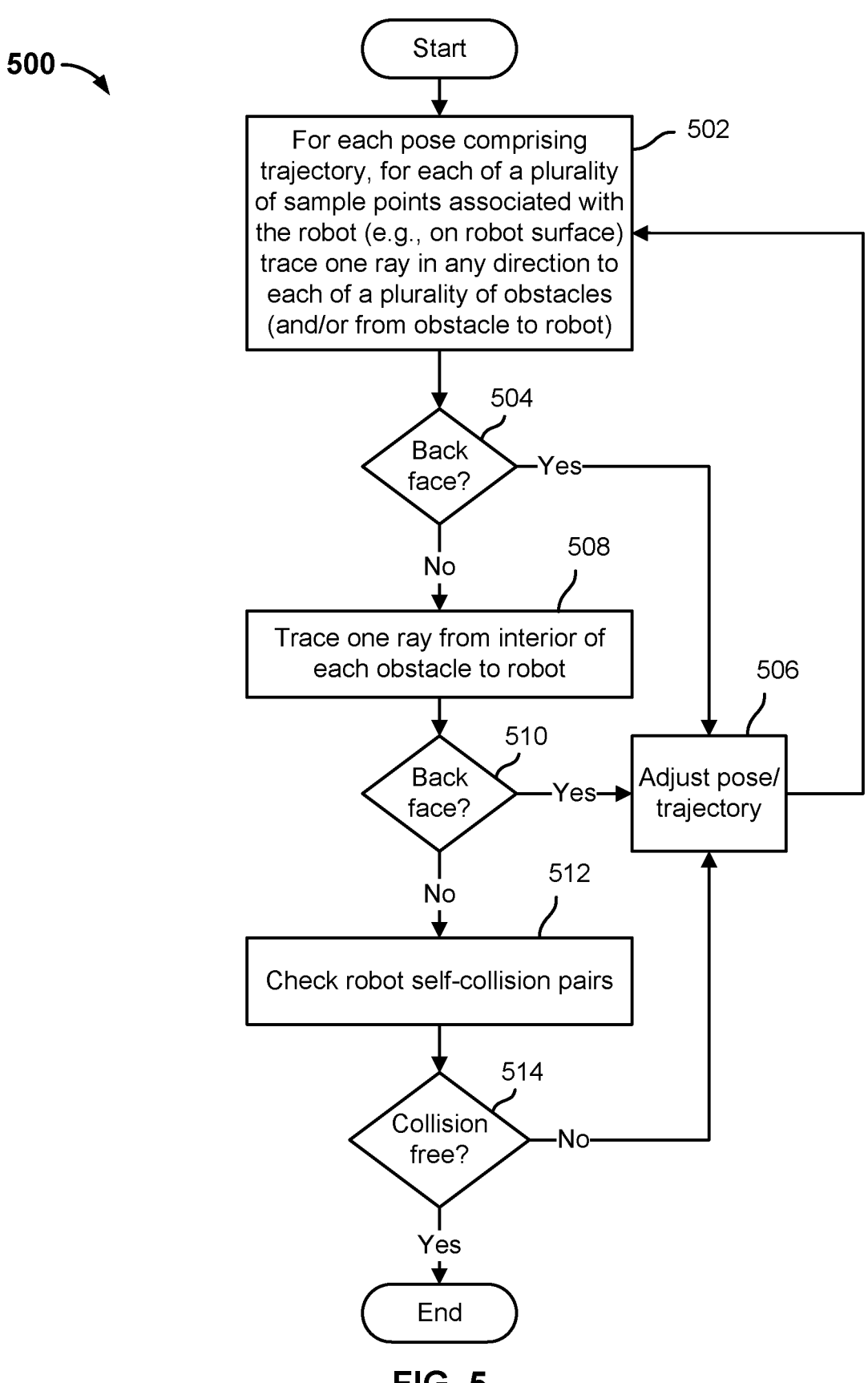
FIG. 5 is a flow diagram illustrating an embodiment of a process to use accelerated ray tracing to check for collision conditions.

FIG. 5 is a flow diagram illustrating an embodiment of a process to use accelerated ray tracing to check for collision conditions. In various embodiments, process 500 of FIG. 5 is performed by a control computer, e.g., a control computer configured to control the robotic system 100 of FIGS. 1A and 1B. In the example shown, at 502, for each pose comprising a trajectory, and with respect to each pose for each of a plurality of sample points on the robot surface, one ray is traced in any direction. In some embodiments, a single ray is traced from each point, in any direction, regardless of the number of obstacles. In some embodiments, a ray is traced with respect to each obstacle. At 504, it is determined whether any back face has been hit (as in FIG. 4A) or, in some embodiments, whether a greater number of back faces than front faces have been hit (as in FIG. 4B). If so, the pose/trajectory is adjusted at 506. For example, gradient information produced in connection with the ray trace processing may be used to determine a direction and distance to move the part of the robot with respect to which collision was detected.

If no back face hit is detected at 506, or if a number of back hits that is not greater than a corresponding number of front hits is detected, processing advances to 508 in which one ray is traced from the interior of each obstacle to the robot. If a back face hit is detected at 510, the pose/trajectory is adjusted at 506 to avoid (or attempt to avoid) the collision. If not, processing proceeds to 512, in which rays are traced to detect collisions with respect to robot self-collision pairs. If a self-collision is detected (514), the pose/trajectory is adjusted at 506. If not, the pose/trajectory is determined to be collision free, and processing ends.

In various embodiments, one or more of steps 502/504, 508/510, and 512/514 may be performed in a parallel, leveraging the massive parallel processing capabilities of the GPU or similar processor.

Figure 6:
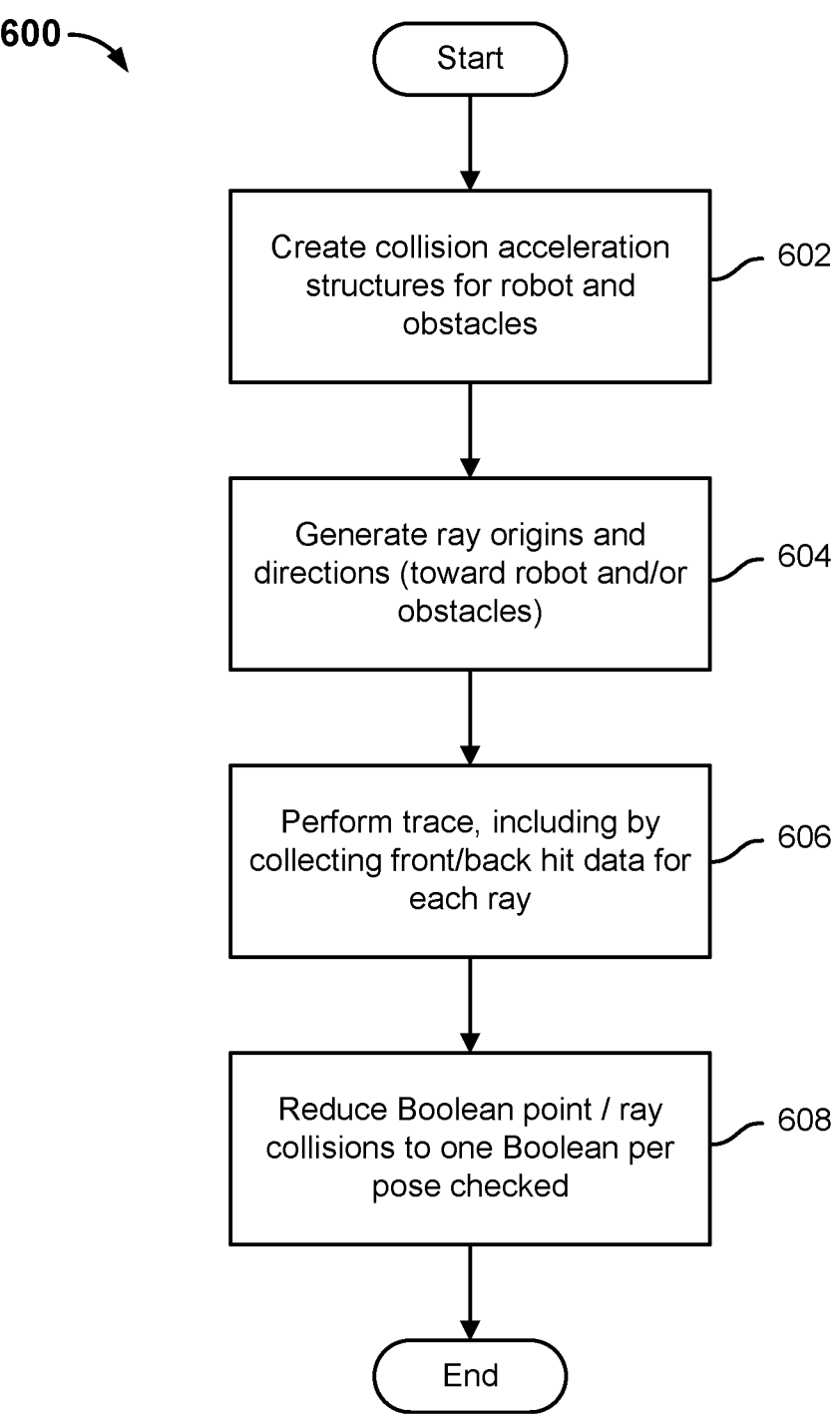
FIG. 6 is a flow diagram illustrating an embodiment of a process to use accelerated ray tracing to check for collision conditions.

FIG. 6 is a flow diagram illustrating an embodiment of a process to use accelerated ray tracing to check for collision conditions. In various embodiments, process 600 of FIG. 6 is performed by a control computer, e.g., a control computer configured to control the robotic system 100 of FIGS. 1A and 1B. In the example shown, at 602 collision acceleration structures are generated for the robot and obstacles. At 604, ray origin points and directions (i.e., towards robot and/or obstacles) are generated. At 606, rays are traced, including by collecting front/back hit data (e.g., counts) for each ray. At 608, the ray-specific Boolean results (e.g., "true" for collision condition detected, "false" if no collision condition detected) are reduce to a single Boolean for each pose check, i.e., collision free or not.

In various embodiments, the process 600 enables the system to determine, given a set of obstacles and a curve through the robot's configuration space, whether the robot would be in collision at any point in its trajectory. That is, to return a single Boolean result of "true" if the robot is in collision with the obstacles/itself at any point along that curve and "false" if not.

In various embodiments, a ray trace-based collision engine may be configured to respond to one or more of the following queries:

Direction-Dependent Nonnegative Point Distance. Given a set of obstacles, a robot configuration, and a direction in configuration space, return zero if the robot at that configuration is in contact with the obstacles/itself. Otherwise, return the minimum distance in configuration space that the robot would need to move in the given direction to be in contact with the obstacles/itself.

Direction-Dependent Signed Point Distance. Given a set of obstacles, a robot configuration, and a direction in configuration space, if the interior of the robot at that configuration is in contact with the obstacles or vice versa, return the negative of the distance the robot must move in the given direction for each to not be in contact with the interior of the other. Otherwise, return the direction-dependent nonnegative point distance.

Nonnegative Point Distance. Given a set of obstacles, a robot configuration, and a direction in configuration space, return zero if the robot at that configuration is in contact with the obstacles/itself. Otherwise, return the minimum distance in configuration space that the robot would need to move in any direction to be in contact with the obstacles/itself.

Signed Point Distance. Given a set of obstacles, a robot configuration, and a direction in configuration space, if the interior of the robot at that configuration is in contact with the obstacles or vice versa, return the negative of the minimum distance the robot must move in the any direction for each to not be in contact with the interior of the other. Otherwise, return the nonnegative point distance.

In various embodiments, curve distance queries may be processed as follows:

Nonnegative Curve Distance. Given a set of obstacles and a curve in the robot configuration space, return the minimum value of the nonnegative point distance across every point on the curve.

Signed Curve Distance. Given a set of obstacles and a curve in the robot configuration space, return the minimum value of the signed point distance across every point on the curve.

In various embodiments, points of interest may be determined as follows:

Closest Points. Given a set of obstacles and a robot configuration, return the point(s) on the robot that are closest to the obstacle set.

Contact Points. Given a set of obstacles and a robot configuration, return points (if any) on the robot that are in contact with the obstacle set.

Points in Deepest Collision. Given a set of obstacles and a robot configuration, return the point(s) on the robot having the lowest non-positive signed distance (if any). Note that these points may not actually be in contact with the obstacle. For example, consider in 2D a ball-shaped robot at the center of a donut obstacle, where the robot's radius is larger than the donut hole. The point on the robot in deepest collision would be the center of the robot, which would be at the center of the donut hole and therefore not in in contact with the donut.

In various embodiments, configurations of interest along a curve may be determined as follows:

Closest Configuration. Given a set of obstacles and a curve in the robot's configuration space, return the configuration(s) along the curve that bring the robot closest to the obstacle set.

Contact Configuration. Given a set of obstacles and a curve in the robot's configuration space, return configurations along the curve where the robot is in contact with the obstacle set.

Configuration in Deepest Collision. Given a set of obstacles and a curve in the robot's configuration space, return the configuration(s) along the curve where the robot has the lowest non-positive signed distance to the obstacle set.

In various embodiments, approximate collision constraints may be determined as follows:

Approximate convex collision constraints. Given a set of obstacles and a robot configuration, return a set of convex constraints approximating the collision avoidance constraint (i.e. the constraint that the robot's configuration must remain in the set of robot configurations which are not in collision). For example, this may be a set of half space constraints in the robot configuration space and/or the space of end effector positions.

In various embodiments, hardware accelerated ray tracing, e.g., by GPU cores specifically configured and optimized to perform ray tracing, enables robotic control functions and operations, such as collision checking and motion planning/generation, to be performed more quickly and efficiently.

In various embodiments, extremely detailed collision information is obtained at a rate that enables robotic control decisions to be made in real time, including in reaction to a dynamically changing environment, based on detailed geometries (robot; workspace; objects, humans, other robots, or other obstacles in the workspace; etc.), e.g., detailed triangle meshes comprising millions of triangles, full/detailed point cloud information from 3D cameras or other sensors, etc. More accurate, timely, and fine grained/detailed collision prediction information is obtained. Time and processing power to simplify geometries is saved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic system, comprising:

a memory configured to store data comprising a geometric representation of a robot and one or more obstacles in a workspace in which the robot is located; and a processor coupled to the memory and configured to use the geometric representation data to determine, with respect to a pose of the robot in the workspace, whether the pose is associated with a collision condition with respect to one or more of the one or more obstacles, at least in part by performing hardware accelerated ray tracing with respect to rays originating from each of a plurality of points associated with the robot;

wherein the processor is configured to determine whether the pose is associated with the collision condition at least in part by tracing a ray in any direction from a point included in the plurality of points on the surface of the robot and determining that the ray intersects a greater number of back faces of respective shapes associated with the respective geometric representation of one or more of the one or more obstacles than front faces of such shapes; and wherein the processor is configured to control the robot based at least in part on a determination that the pose is associated with the collision condition.

2. The system of claim 1, points associated comprises one or more of a point on a surface of the robot, a point internal to a robot or component thereof, and a point on or in an obstacle.

3. The system of claim 1, wherein the pose comprises one or both of a starting pose and an end pose associated with a high-level task the robot is to be used to perform and the processor is configured to determine whether the pose is associated with a collision condition in connection with a making a decision about the high level task.

4. The system of claim 1, wherein the pose is associated with a trajectory being planned for the robot and the processor is configured to determine whether the pose is associated with a collision condition in connection with planning the trajectory.

5. The system of claim 4, wherein the processor is configured to determine whether the pose is associated with a collision condition in connection with planning the trajectory.

6. The system of claim 5, wherein the pose comprises a first pose included in a plurality of poses and the processor is configured to determine whether any pose in the plurality of poses is associated with a collision condition.

7. The system of claim 1, wherein the collision condition is associated with an obstacle that moved or may have moved since the robot began to be moved through a trajectory.

8. The system of claim 1, further comprising a communication interface and wherein the processor is configured to communicate to the robot via the communication interface a control command determined based at least in part on the determination of whether the pose is associated with the collision condition.

9. The system of claim 1, wherein the processor comprises a graphics processing unit (GPU).

10. The system of claim 9, wherein the GPU comprises a plurality of ray tracing cores.

11. The system of claim 1, wherein the processor is further configured to determine an alternate pose to a pose determined to be associated with a collision condition.

12. The system of claim 11, wherein the processor is configured to use gradient information produced in connection with said hardware accelerated ray tracing to determine one or both of a direction in which and a distance by which to adjust the pose.

13. The system of claim 1, wherein the processor is further configured to receive via a communication interface perception data from a perception module configured to determine based on sensor data from one or more sensors one or more of a size, shape, dimensions, and location of the robot and each of at least a subset of the one or more obstacles.

14. The system of claim 1, wherein the processor is configured to determine whether the pose is associated with the collision condition at least in part by tracing a ray in any direction from a point included in the plurality of points on the surface of the robot and determining whether the ray first intersects a back face of a shape associated with the geometric representation of one of the obstacles.

15. The system of claim 1, wherein the processor is configured to detect whether the pose is associated with the collision condition at least in part by creating mesh approximations of the robot and obstacles; tracing rays along the edges of the posed mesh representations of the robot towards the original representations of the one or more obstacles, and concluding the pose is associated with the collision condition if any ray is determined to intersect with an obstacle.

16. The system of claim 1, wherein the processor is further configured to determine whether the pose is associated with a collision condition with respect to robot itself at least in part by performing ray tracing-based collision detection with respect to robot geometry self-collision pairs.

17. A method, comprising:

receiving data comprising a geometric representation of a robot and one or more obstacles in a workspace in which the robot is located; and using the geometric representation data to determine, with respect to a pose of the robot in the workspace, whether the pose is associated with a collision condition with respect to one or more of the one or more obstacles, at least in part by performing hardware accelerated ray tracing with respect to rays originating from each of a plurality of points associated with the robot;

wherein the determination whether the pose is associated with the collision condition is made at least in part by tracing a ray in any direction from a point included in the plurality of points on the surface of the robot and determining that the ray intersects a greater number of back faces of respective shapes associated with the respective geometric representation of one or more of the one or more obstacles than front faces of such shapes; and further comprising controlling the robot based at least in part on a determination that the pose is associated with the collision condition.

18. A computer program product embodied in a non-transitory computer readable medium and comprising computer instructions executed by a processor to:

receiving data comprising a geometric representation of a robot and one or more obstacles in a workspace in which the robot is located; and using the geometric representation data to determine, with respect to a pose of the robot in the workspace, whether the pose is associated with a collision condition with respect to one or more of the one or more obstacles, at least in part by performing hardware accelerated ray tracing with respect to rays originating from each of a plurality of points associated with the robot;

wherein the determination whether the pose is associated with the collision condition is made at least in part by tracing a ray in any direction from a point included in the plurality of points on the surface of the robot and determining that the ray intersects a greater number of back faces of respective shapes associated with the respective geometric representation of one or more of the one or more obstacles than front faces of such shapes; and further comprising further comprising computer instructions executed by the processor to control the robot based at least in part on a determination that the pose is associated with the collision condition.

* * * * *